Oct. 26, 1943.         W. H. JORDAN                2,332,725
                   VARIABLE PRESSURE SYSTEM
           Filed March 18, 1941          2 Sheets-Sheet 1

Inventor
William H. Jordan,
By Church & Church
His Attorneys

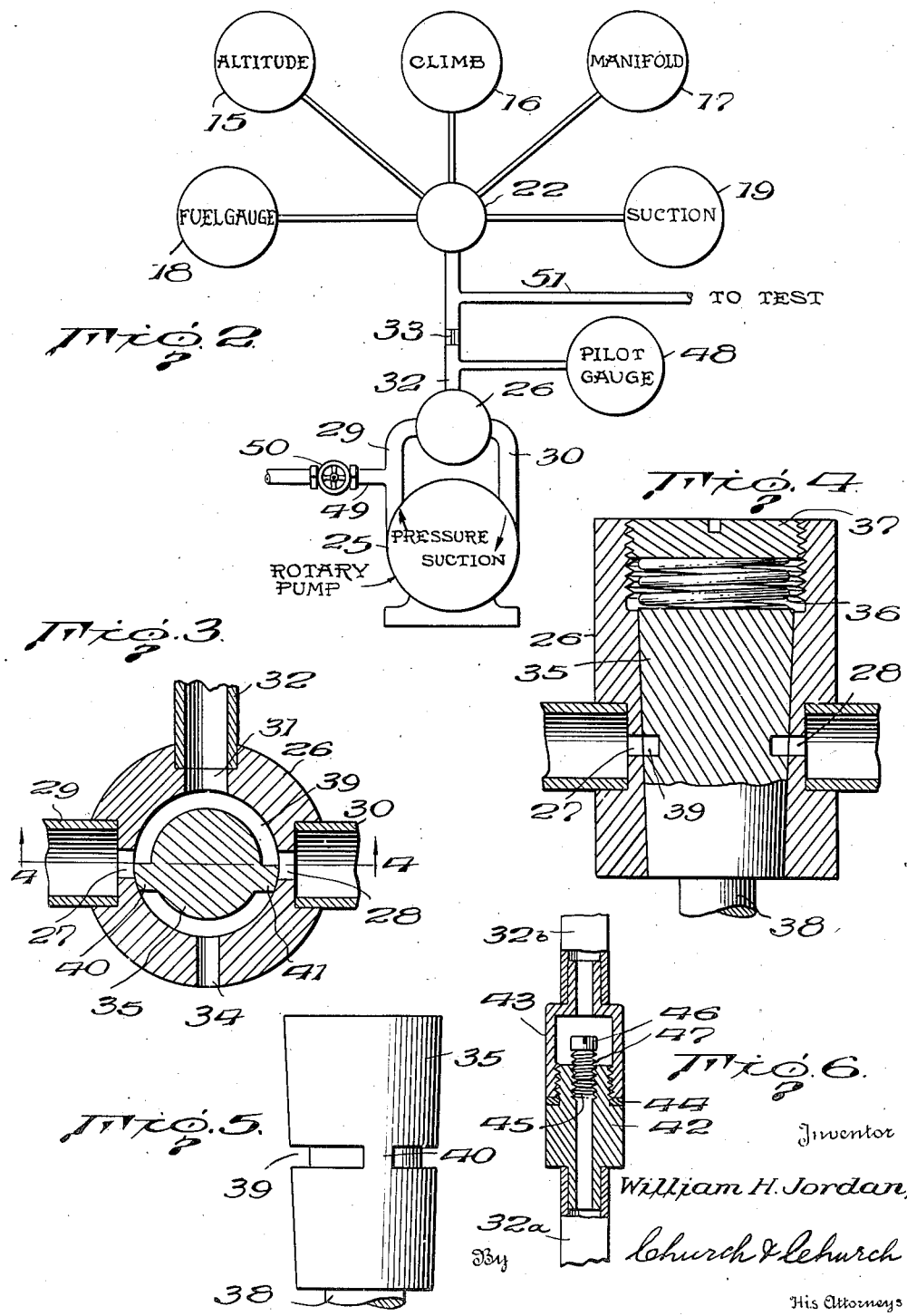

Patented Oct. 26, 1943

2,332,725

UNITED STATES PATENT OFFICE 2,332,725

VARIABLE PRESSURE SYSTEM

William H. Jordan, Kansas City, Mo.

Application March 18, 1941, Serial No. 384,023

8 Claims. (Cl. 73—51)

This invention relates to variable pressure systems and more particularly to systems by which the pressure of a gas, such as air, may be varied continuously and accurately to effect any pressure as desired through a range from a pressure far below that of atmospheric pressure to a pressure more than twice that of atmospheric pressure. The invention is applicable to many uses, and is herein shown and described as embodied in a portable assembly or kit for the testing of airplane instruments while they are in place in the instrument panel of the airplane.

As a matter of convenience, and in accord with common practice, the amount of reduction of pressure below atmospheric pressure will be referred to as "suction," while the amount of pressure above atmospheric pressure will be referred to as "pressure," both being measured in inches of mercury. That is to say, a "pressure of ten inches" means a pressure of ten inches of mercury above that of atmospheric pressure, and if the atmospheric pressure is normal (30 inches of mercury, as measured by a barometer) a pressure of ten inches means an absolute pressure of 40 inches of mercury which would correspond to approximately 20 pounds to the square inch. Similarly, a "suction of 10 inches" would correspond to an absolute pressure of 20 inches of mercury or about 10 pounds to the square inch.

One of the principal objects of the invention is to provide a combined gaseous pressure and suction system which can be readily controlled to supply any desired pressure or suction of a continuous series of values from a suction of over twenty inches of mercury to a pressure of over thirty inches of mercury.

A further object of the invention is to provide a portable kit comprising such a variable pressure system and suitable indicating and controlling devices and connections, by which instruments such as the various instruments and gauges installed upon an airplane may be safely and accurately tested.

Further objects of the invention are to provide such a variable pressure system which is of simple and durable construction and which can be economically manufactured; a system which will maintain steadily the pressure or suction to which it has been adjusted; and a system which may safely be used by relatively unskilled operators.

Still further objects of the invention and novel features of construction and operation will be understood from the following specification when read in connection with the accompanying drawings which illustrate an embodiment of the invention in a portable kit for testing airplane instruments; and in which:

Fig. 2 is a schematic diagram of the various parts and connections of the system and gauges;

Fig. 3 is an enlarged view in transverse section of the master control valve;

Fig. 4 is an enlarged view in longitudinal section of the valve, taken on line 4—4 of Fig. 3;

Fig. 5 is an enlarged view in elevation of the core of the valve structure shown in Figs. 3 and 4; and Fig. 6 is an enlarged view in longitudinal section of a restrictor structure suitable to provide an adjustable restriction to the flow in the service line.

Figure 1:
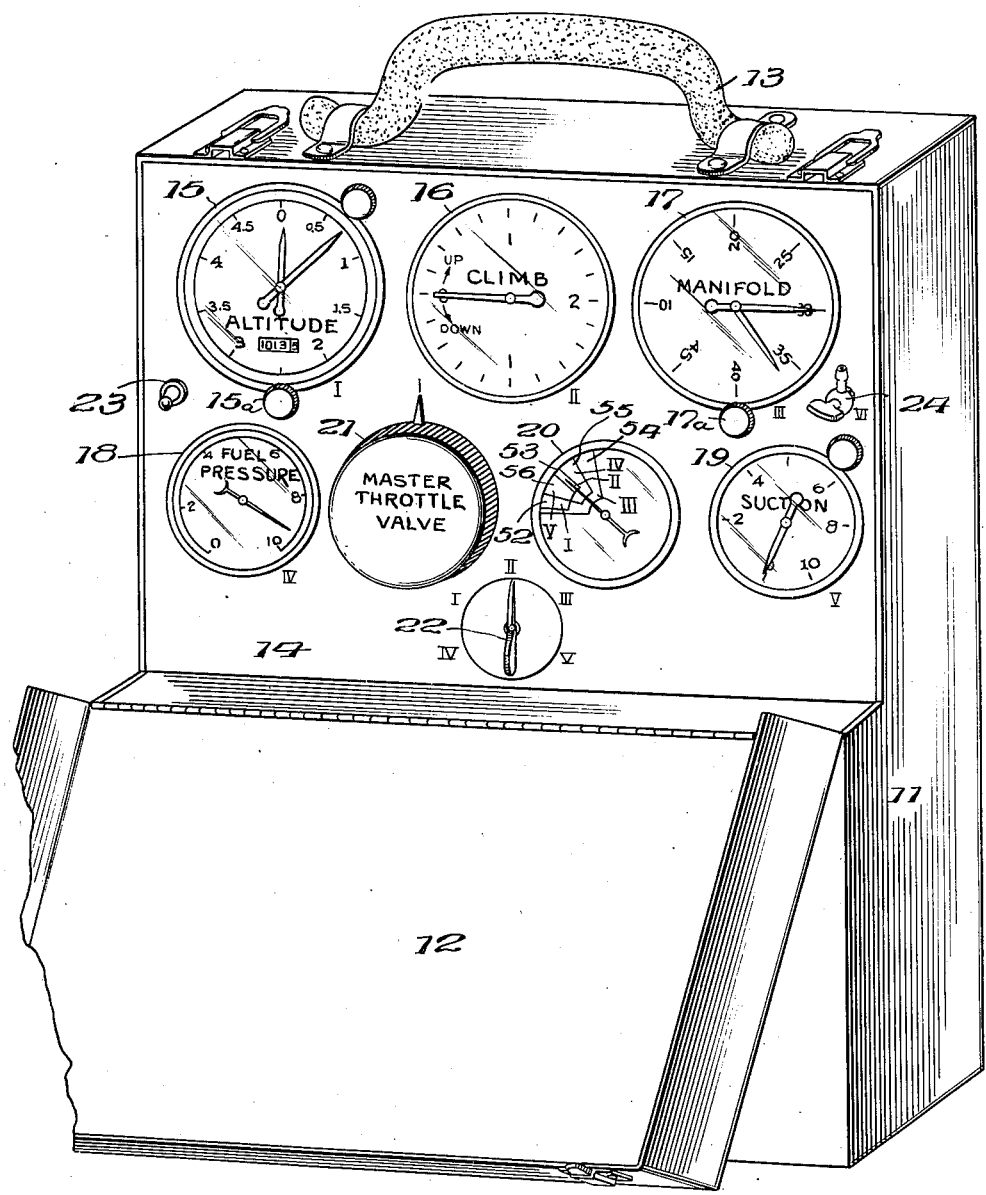
Fig. 1 is a view in perspective of the front of the kit, with the cover or door opened to show the control panel.

In general, the invention comprises a rotary pump and motor unit; the pressure side of the pump and the suction side of the pump being connected to separate ports in a valve which is so constructed that, as the valve is operated, the size of the openings of the pressure side and the suction side of the pump to a port connected to the service line may be varied, one opening being gradually decreased as the other is increased, a restrictor being provided in the service line, and a manually-operable reducing-gear device being provided for minute and accurate control of the valve. For use in testing airplane instruments while installed in the airplane the pump, motor, valve and suitable connections are installed in a portable casing, along with standard counterparts of the instruments or gauges which are to be tested, and a master pilot gauge which indicates the value of the pressure or suction in the service line at any instant and when it is safe to connect the service line to any particular instrument, along with suitable means for connecting the service line at will to each such instrument. It will be understood that, after establishing in the service line a pressure or suction within the range that may be safely applied to a given instrument, connections are made from the service line to that particular instrument on the testing kit panel and, after such further check of the fact that the pressure or suction may be safely applied, the service line is also connected to the companion instrument on the airplane and the readings of the two instruments are compared while the pressure, or suction, is varied slowly throughout the range of such instruments.

In the structure shown in the drawings a suitable casing or box 11, preferably having a hinged front cover 12 and a carrying handle 13, is provided to hold the various parts and act as a support for a panel 14 in which the various instruments, gauges and valve-control means are mounted.

It will be understood that such a kit for testing the instruments of airplanes of any particular model would include a standard instrument identical with each pressure-responsive or suction-responsive instrument of such model. In the present instance, there are shown an altimeter gauge 15, a rate of climb indicator 16, a manifold or supercharger pressure indicator 17, a fuel pressure indicator 18 and a suction indicator 19, together with a master pilot gauge 20, a control knob 21, preferably containing reducing gearing, by which the control valve may be continuously adjusted in either direction, a distributing valve 22 by which the service line may be conveniently connected to any one of the instruments 15 to 19 as desired, and preferably an electric switch 23 for controlling the pump-operating motor and a valved outlet 24 for the convenient connection of a flexible rubber tube, or the like, for any desired purpose for which such air pressure or suction may be usable. If a reduction gearing is desired, it has been found to be convenient to use a control knob 21 and contained gearing such as those commonly used for controlling the tuning of radio sets.

As shown, the various instruments 15 to 19 and the valved outlet 24 are provided, respectively, with the indicia I to VI, and corresponding indicia are provided for registry with a pointer on the handle of distributing valve 22 to indicate the position in which the valve establishes connection to each of such devices. It will be understood that characteristic colors or other corresponding indicia could be used to facilitate correct positioning of the distributing valve 22, instead of such Roman numerals.

The variable pressure system is shown diagrammatically in Fig. 2, and comprises essentially an electric motor and rotary pump combination 25, preferably built as a single unit, a valve 26 having circular ports 27 and 28 connected, by conduits 29 and 30, to the pressure side of the rotary pump and to the suction side of the rotary pump, respectively, said valve also having a port 31 connecting to a service line 32 in which there is a restrictor 33.

The valve 26 is so constructed that either the pressure port 27 or the suction port 28 may be fully connected to the service line port 31 and as either the pressure port 27 or the suction port 28 is gradually opened the other of such ports will be gradually closed. The valve 26 is also preferably formed with a port 34 to atmosphere, for connecting to atmosphere either the pressure port 27 or the suction port 28 after the valve has been moved to close such port and such motion of the valve is continued.

The valve is preferably, as shown, of the "plug valve" type, comprising a body having a frusto-conical bore in which a plug or core 35 of generally frusto-conical shape is rotatably fitted, being detachably held in seated position by a helical spring 36 and a plug 37 which is threaded in the end of the valve body and by means of which the tension of the spring may be adjusted. At its smaller end the core 35 is provided with a stem 38 by which the core may be rotated. It is essential that means be provided by which the position of the valve may be adjusted by infinitesimal increments, and for this purpose the reducing-gear control means 21 is utilized, such control means 21 being connected to the stem 38 of the valve and being preferably of the type commonly used to control radio receiving-sets, reducing gears being housed in the knob and so constructed that twenty or more revolutions of the knob are necessary to effect a single rotation of the valve. The ports 27, 28, 31 and 34 are all in the same plane perpendicular to the axis of the core 35, and the core is provided with an annular groove 39 in such plane except for webs 40 and 41, each of which, as shown best in Fig. 3, is of such circumferential extent as to be capable of closing the port 27 or the port 28, respectively, with which it cooperates, but which webs 40 and 41 are so positioned relative to each other and relative to the ports 27 and 28 that when one port is fully closed the other is fully open and in an intermediate position of the valve core both ports are substantially half open.

The restrictor 33 is so fine as to pass only a few cubic inches of air therethrough per minute at a difference in pressure of 20 inches of mercury. Such restrictor is preferably so constructed that its effective opening may be adjusted, and in Fig. 6 there is shown a restrictor construction that has been found to be practical and effective. In this construction a tubular body 42 and a cap 43 threaded thereon, with an intervening packing washer 44, are connected, respectively, to the conduits 32a and 32b which constitute parts of the service line 32. The tubular body 42 is formed with a female thread 45 to receive a screw 46 having a male thread 47 which differs slightly in pitch or cross-sectional shape from that of the thread 45. As a consequence the air is forced to traverse a rather extended helical path about the screw 46, and the length of such path can be varied by rotation of the screw 46.

The rotary pump 25 may be of the triple vane rotor type and is preferably combined as a unit with an electric motor which preferably is of the universal type. A practical size of such a unit weighs about four pounds and will handle approximately 1 cubic foot of air per minute and will develop a suction of approximately 25 inches of mercury or a pressure of approximately 35 inches of mercury.

The system described, comprising the rotary pump and motor unit 25, the valve 26 and its reducing-gear controlling-means, and the necessary connections including a service line 32 and a restrictor 33 therein, is of great utility wherever accurately-controlled and widely-variable pressure and suction is needed, for instance by dentists or in hospitals where atomizers, suction devices and the like are to be operated. For such installations it is usually advisable to connect to the service line 32 a gauge 48 which will indicate the value of the pressure or suction existing at any instant. It also is usually advisable, although not necessary, to add a connection 49, having a valve 50, which communicates with the pressure connection 29, so that the full pressure and volume of air from the pump may be utilized without being reduced by, or necessitating operation of, the valve 26.

In the specific embodiment herein disclosed of an airplane-instrument testing kit incorporating this system, the connections of the parts are as hereinbefore described but include the further connections from the service line 32 to the various standard instruments 15, 16, 17, 18 and 19, as by means of the distributing valve 22 and its connections to such instruments, and an additional test line 51, which is preferably a flexible tube, for convenient connection to each of the instruments on the airplane, in turn, after the pressure or suction has been adjusted to the correct value suitable for such instrument and connection of the service line 32 has been made to the corresponding instrument 15 to 19 of the test kit. The valved outlet 24 on the panel of the testing kit may be connected either to the line 49 or to the test line 51, shown in Fig. 2. That is to say, such connection may be provided either for the convenient use of the full pressure developed by the pump or for the convenient use for some additional purpose of a pressure or suction controlled by the master valve 26 in response to operation of the knob 21.

An altimeter, such as that shown at 15, is usually provided with a knob 15a by which the dial may be rotated and be thereby set to a given basic altitude, and a manifold pressure indicator, such as shown at 17, is usually provided with a similar knob 17a by which the dial may be rotated to set the normal pressure point in accordance with the existing barometric pressure.

The altimeter 15 is a very delicate aneroid barometer; the units on the one herein shown indicating thousands of meters. The range of such an altimeter is from a pressure of zero (atmospheric pressure) to a suction of over 15 inches of mercury, and it will be appreciated that such an instrument would be injured and possibly rendered worthless if subjected to any pressure, that is, to a pressure materially exceeding atmospheric pressure.

The rate of climb indicator 16 is of practically the same construction and sensitivity as the altimeter 15 but is provided with a small vent through which the pressure gradually tends to equalize. On the instrument shown the units correspond to thousands of feet per minute.

The manifold pressure indicator 17 is marked to indicate absolute pressure in inches of mercury, the normal point, at 30.5, corresponding to normal atmospheric pressure. It will be appreciated that such an indicator normally is used to register the supercharger pressure.

The fuel pressure gauge 18, marked to indicate in units from 0 to 10 corresponding to inches of mercury pressure on the fuel feed is not so sensitive as the altimeter or rate of climb indicator but should not be subjected to any material suction or to a pressure exceeding 14 or 15 inches of mercury.

The suction gauge or indicator 19, usually marked to indicate in units from 0 to 10 corresponding to inches of mercury suction, has only a limited tolerance of pressure without injury, and should not be subjected to a pressure exceeding that of several inches of mercury or to a suction exceeding 14 or 15 inches of mercury.

The master pilot gauge 20 is a combination suction and pressure gauge having a tolerance range from at least 28 inches of mercury suction to at least 25 inches of mercury pressure. It has an indication of the range, as 52, from 0 to 15 inches of mercury suction, which may be safely applied to the altimeter 15 (I), an indication of the range, as 53, from a few inches of mercury pressure to a few inches of mercury suction, which may be safely applied to the rate of climb indicator 16 (II), an indication of the range, as 54, from 20 inches of mercury suction to 20 inches of mercury pressure which may be safely applied to the manifold gauge 17 (III), an indication of the range, as 55, from slightly below 0 to 10 inches of mercury pressure which may be safely applied to the pressure gauge 18 (IV), and an indication of the range, as 56, from slightly about 0 to 10 inches of mercury suction which may be safely applied to the suction gauge 19 (V). As suggested heretofore, instead of the use of the Roman numerals I to V, to associate each instrument with its corresponding range on the master pilot gauge 20 and with that position of valve 22 which establishes connection to such instrument, other suitably corresponding indicia, such as the letters A to E or spots of various corresponding colors could be used.

The kit as a whole is of light weight and it will be appreciated that the lead in wires, for establishing power connection to the pump-operating motor, as well as the rubber tube or the like, which comprises the test line 51, may be conveniently stored in the opening at the base of the panel 14.

The system as a whole will furnish a steady pressure or suction of any desired value between the specified limits, and throughout such range of pressure the rate of change of the pressure by the master control valve is substantially uniform, that is to say, an angular movement of the reducing gear control knob 21 through a given arc will effect a substantially equal change of pressure at any point throughout the range of pressure or suction values.

What I claim is:

1. A gaseous pressure and suction system, comprising a rotary pump having an inlet and an outlet, means for rotating said pump, a service line, a valve having a port connected to said service line and pressure-control ports connected, respectively, to the inlet and to the outlet of said pump and means for simultaneously maintaining communication between the service line port and both of said pressure control ports and increasing the opening of one of said pressure-control ports as the opening of the other of said pressure-control ports is decreased.

2. A gaseous pressure and suction system comprising a pump having a pressure side and a suction side, means for rotating said pump, a service line, valve means simultaneously connecting said pressure side and said suction side to said service line through restricting ports, said means being effective to increase the area of the port from the pump pressure side as the area of the port from the pump suction side is decreased and vice versa, and means for manually controlling said valve means.

3. A gaseous pressure and suction system, comprising a rotary pump having an inlet and an outlet, means for rotating said pump, a service line, a rotary valve having a port connected to said service line and pressure-control ports connected to said service line port and also connected, respectively, to the inlet and to the outlet of said pump and effective upon continuous movement to simultaneously and continuously increase the opening of either of said control ports and decrease the opening of the other control-port to vary the connection of said control-ports to said service line port, and a manually-operable means for rotating said valve.

4. A gaseous pressure and suction system, comprising a rotary pump having an inlet and an outlet, means for rotating said pump, a service line, valve means for simultaneously connecting said inlet and said outlet to each other and to said service line through restricting ports, said means being effective upon operation in one direction to continuously and simultaneously increase the area of one of said ports and decrease the area of the other of said ports and, upon continued operation after one of said ports has been disconnected from said service line, to connect said port to atmosphere while maintaining the connection between the other of said ports and said service line, and means for operating said valve means in either direction.

5. A kit for testing various instruments that are responsive to variations of air pressure, comprising a service line for selective connection to the instruments to be tested, said service line having a restriction therein, a pump having an inlet and an outlet, means for operating said pump, means connecting said inlet and said outlet to each other and to said service line including valve means having ports connected respectively to said inlet and said outlet and means for decreasing the area of either of said ports as the area of the other of said ports is increased, manually operable means for controlling said valve means, and a gauge responsive to the pressure in said service line and having indicia defining the ranges of pressures that may be safely applied to each of said instruments respectively.

6. A kit for testing various instruments that are responsive to variations of air pressure, comprising a plurality of instruments corresponding respectively with the instruments to be tested, a service line for selective connection to the instruments to be tested and having a branch for selective connection to the instruments of said kit, said service line having a restriction therein to reduce the rate of flow to or from any of such instruments, a pump having an inlet and an outlet, means for operating said pump, valve means connecting said inlet and said outlet to each other and to said service line through restricting ports, said valve means being effective to simultaneously increase the area of the port from the pump outlet and decrease the area of the port from the pump inlet and vice versa, and means for manually controlling said valve means.

7. A portable kit for testing various instruments that are responsive to variations of air pressure, comprising a plurality of instruments corresponding respectively with the instruments to be tested, a service line having a branch for selective connection with an instrument of the kit and a branch for selective connection with the corresponding instrument to be tested, said service line having a restriction therein, a pump having an inlet and an outlet, means for operating said pump, valve means connecting said inlet and outlet simultaneously to said service line through continuously and oppositely variable restricting ports, means for controlling said valve means, and a gauge connected to said service line and indicating when the pressure in said service line is within the tolerance of each of said instruments.

8. A portable kit for testing various instruments that are responsive to variations of air pressure, comprising a casing, a plurality of instruments mounted on said casing and corresponding respectively with the instruments to be tested, a gauge mounted on said casing and bearing indicia indicating the ranges of pressures that may be safely applied to each of said instruments respectively, and means for supplying to said gauge and any of said instruments a constant pressure of any desired value throughout a continuous range extending materially below and above atmospheric pressure comprising a rotary pump having an inlet and an outlet, an electric motor for operating said pump, said pump and motor being housed in said casing, a service line for selective connection to any of said instruments and having a restriction thereon, valve means mounted on said casing having a port connected to said service line and pressure-control ports connected respectively to said inlet and said outlet of said pump, and manually-operable means for operating said valve means to simultaneously increase the area of one of said pressure-control ports and decrease the area of the other of said ports.

WILLIAM H. JORDAN.